J. L. WOODBRIDGE.
SYSTEM OF ELECTRICAL DISTRIBUTION.
APPLICATION FILED AUG. 25, 1910.
1,120,006.
Patented Dec. 8, 1914.
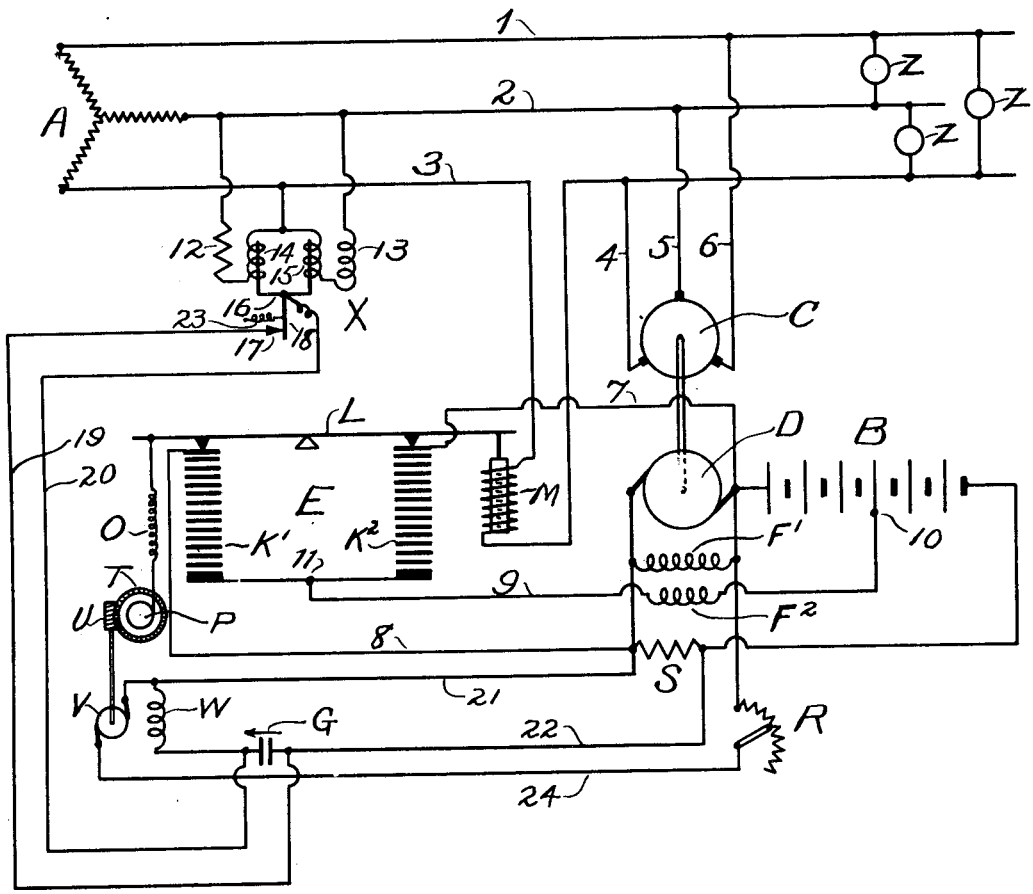
Inventor
Joseph Lester Woodbridge,
by
Augustus B. Stoughton
Attorney
Witnesses

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

1,120,006.  Specification of Letters Patent.  Patented Dec. 8, 1914.

Application filed August 25, 1910. Serial No. 578,853.

*To all whom it may concern:*

Be it known that I, JOSEPH LESTER WOODBRIDGE, a citizen of the United States, and residing in the city of Philadelphia, State of Pennsylvania, have invented certain new and useful Improvements in Systems of Electrical Distribution, of which the following is a specification.

My invention relates to systems such as described in Patent No. 895760 to R. C. Hull and Patent #895825 to myself. In these systems a storage battery and regulating apparatus are provided for controlling the fluctuations of load of an electric circuit, and a device is also included for adjusting the ordinary battery regulating apparatus whereby slow changes in the average load are transferred to the generating source. In the patent last mentioned above means are provided for stopping the transfer of load to the generator when the generator load reaches some predetermined valve, such means, as disclosed in that patent, being directly responsive to the load on the generator. In the present invention I provide similar means for stopping the transfer of load to the generator, but in this case these means are made responsive to the speed of the generator rather than to the load on the same. This modification presents certain advantages over the system disclosed in my patent above cited under certain conditions, particularly where the number of generators connected to the circuit is varied from time to time thus requiring either a device in circuit with each generator, or the frequent adjustment of the device for limiting the generator load if only one of these is connected into the circuit carrying the total generator load.

My invention will be more clearly understood by reference to the following description taken in connection with the accompanying drawing.

The drawing is a diagrammatic view of a system of electric distribution embodying features of the invention.

In the drawing A is a source of 3 phase alternating current connected to the circuit 1—2—3 and supplying power to the translating devices Z. It will be understood that the speed of the source A and the frequency of the alternating current supplied thereby will vary more or less with the amount of load on said source. A storage battery B is shown connected across the terminals of a direct current machine D which is direct connected to a synchronous machine C, the latter being electrically connected by the conductors 4—5—6 to the circuit 1—2—3 in the usual manner. The machine D is provided with the usual shunt field winding $F^1$, and a regulating field winding $F^2$. This latter winding is controlled by the carbon regulator E in the usual manner. This regulator consists of 2 piles of carbon disks $K^1$ and $K^2$ connected in series across the battery B and subjected to pressure by means of the lever L pivoted at its center. The operation of this lever is controlled by a solenoid M at one end, this solenoid being connected into the conductor 3, and by an adjustable spring O at the other end. The field winding $F^2$ is connected between the middle point of the battery B and a point in the circuit intermediate between the two carbon piles $K^1$ and $K^2$ so that variation in pressure on one or the other of these piles, produced by the lever L, will control the amount and direction of current in the field winding $F^2$. The effect of this field winding will be to increase or decrease the total excitation of the machine, raising or lowering its voltage above or below that of the battery, thus causing the battery to charge and discharge in response to fluctuations of load on the circuit 1—2—3. The average load on the source A will be determined by the adjustment of the tension of the spring O. This tension may be varied by turning the drum P to which one end of the spring is attached. The motion of the drum P is produced by the worm gear T and the worm U, the latter being operated by the motor V. The armature of the motor V is supplied with a substantially constant current by being connected across the terminals of the machine D by means of conductors 21 and 24. The amount of current in this circuit may be adjusted by means of the rheostat R. The field winding W of the motor V is connected across a resistance S in the battery circuit so that normally the current in the field winding W varies in amount and direction with the charge and discharge of the battery.

The mode of operation of the apparatus thus far described is as follows: When the battery is discharging, due to an increase of load on the circuit 1—2—3, the excitation of the field winding W produces motion of the motor V in the direction to increase the tension of the spring O and transfer the increase of load gradually to the source A. When the battery is charging the motor V operates in the opposite direction relieving the source A of a portion of its load.

In order to prevent further transfer of load to the source A under certain conditions, a device X is shown, and an electrolytic valve G. The latter is connected in the circuit of the field W and is normally short circuited at the contact 17—18, so that it has no effect so long as this contact is closed. The device X may be a standard frequency indicator such as is ordinarily employed for indicating on a dial the frequency of an alternating current circuit, and in the drawings it is shown as such, although in simplified and somewhat diagrammatic form. A frequency indicator is a well understood appliance and it indicates a change of frequency by the movement of a pointer. In the present case 18 represents the pointer. When the frequency changes the pointer moves in one direction or the other and remains at rest until there is another change of frequency. If the indicator is intended for use in connection with, for example, a frequency of 25 cycles per second the pointer will move in response to a very small change, such as one quarter of a cycle per second. Such an indicator as has been last described can be adapted for applicant's use by causing its pointer to coöperate with a contact such as 17, so that when the pointer moves it makes and breaks a circuit at the contact. The contact finger 18 is pivoted at 16, and is normally held in contact with the contact point 17 by means of the spring 23. The position of the contact finger 18 is controlled by two solenoids 14 and 15. Solenoid 14 tends to bring the finger 18 into contact with the point 17, while the solenoid 15 tends to open said contact. These two solenoids are connected across the conductors 2 and 3. In series with solenoid 14 is a noninductive resistance 12. In series with solenoid 15 is an inductance coil 13. At some predetermined frequency on the alternating current circuit these two solenoids 14 and 15 will just balance each other. The effect of the resistance 12 will not be altered by change of frequency while the reactance of the inductance coil 13 will vary with the frequency so that a reduction in the frequency will cause the current in the solenoid 15 to increase. If the frequency on the circuit 1—2—3 falls to a certain point this increase of current in the solenoid 15 will be sufficient to overcome the tension of the spring 23, and open the contact at 17—18. This will open the short circuit around the valve G and this valve is so connected into the circuit as to prevent a flow of current through the field W in the direction to cause further increase of load on the source A. The valve G will, however, permit a flow of current in the opposite direction so that if the load on the circuit 1—2—3 falls off to such an extent as to cause the battery to charge, the reversal of current in the resistance S will produce a flow of current in the field W in the direction to relieve the source A of some of its load and the increase in speed resulting from this will weaken the effect of solenoid 15 and restore the contact at 17 and 18.

The apparatus shown at X is similar to well known devices for indicating variations of frequency on an alternating current circuit. It will be understood, however, that any other of the well known means responsive to changes of frequency or speed may be substituted for the device shown at X.

Other changes in details may be made without departing from the spirit of the invention.

What I claim, therefore, and desire to secure by Letters Patent is:

1. A system of electrical distribution comprising the combination of an alternating current circuit, a storage battery, a battery circuit, transforming apparatus for transferring energy between the battery circuit and the alternating current circuit, a regulator for said transforming apparatus having parts responsive to fluctuations from an average condition on the alternating current circuit, means responsive to the electrical condition of the battery circuit for adjusting the regulator, and a device responsive to the frequency on the circuit for interrupting the operation of the adjusting means, substantially as described.

2. A system of electrical distribution comprising the combination of an alternating current circuit and its source, a storage battery, transforming apparatus for transferring energy between the battery and the circuit, a regulator for the transforming apparatus and which is responsive to changes of load, and adapted to refer quick fluctuations to the battery and slower fluctuations to the source, and means responsive to frequency and adapted to prevent the regulator from referring slower fluctuations to the source, substantially as described.

In testimony whereof, I have hereunto signed my name.

JOSEPH LESTER WOODBRIDGE.

Witnesses:
R. A. WHETSTONE, Jr.,
C. AMBRUSTER.